United States Patent [19]

Thompson

[11] Patent Number: 4,858,864
[45] Date of Patent: Aug. 22, 1989

[54] TILT AND SWIVEL MECHANISM

[75] Inventor: Dennis C. Thompson, Roseville, Calif.

[73] Assignee: Hewlett-Packard Company, Palo Alto, Calif.

[21] Appl. No.: 8,804

[22] Filed: Jan. 30, 1987

[51] Int. Cl.⁴ .............................................. F16M 11/04
[52] U.S. Cl. ...................................... 248/178; 248/371; 248/183; 248/923
[58] Field of Search .............. 248/179, 371, 346, 349, 248/178, 372.1, 1 C, 1 E, 1 F, 1 I, 183

[56] References Cited

U.S. PATENT DOCUMENTS 4,372,515 2/1983 Noonan ................................ 248/178
4,494,720 1/1985 Gregory et al. ................ 248/346 X

FOREIGN PATENT DOCUMENTS 128511 12/1984 European Pat. Off. ............ 248/371

Primary Examiner—Alvin C. Chin-Shue
Attorney, Agent, or Firm—Alan H. Haggard

[57] ABSTRACT

An improved tilt and swivel mechanism is presented in accordance with the preferred embodiment of the present invention. The mechanism includes a base on which is placed a rocker. The rocker moves in a rocking motion with respect to the base. The rocker is prevented from moving in a sliding motion with respect to the base. The present design allows for simplicity of manufacture and maximum ease of use.

1 Claim, 6 Drawing Sheets

TILT AND SWIVEL MECHANISM

BACKGROUND

A tilt and swivel mechanism allows a user to adjust the position of a video display device (whether a terminal or monitor) for maximum viewing comfort. A typical prior art tilt and swivel mechanism is shown in FIG. 1. In FIG. 1, a swivel "ring" 102 rests on a stationary display "base" 101 Ring 102 rotates within monitor base 101 as shown by arrows 110. This provides swivel motion. FIG. 3 shows ring 102 assembled upon monitor base 104.

In FIG. 1, a cylindrical shaped sliding "drum" 103 is placed upon ring 102. Drum 103 moves in a sliding motion in respect to ring 102, as shown by arrow 112. This provides "tilt" motion. A cross-sectional view of drum 103 upon ring 102 is shown in FIG. 2. Arrows 113 and 114 show the direction drum 103 travels in respect to ring 102.

In order to hold drum 103 in place, a screw 105 is connected through a washer 115, through a friction spring 107, through monitor base 101, through ring 102 through drum 103 to a guide "retainer" 104. A slot 106 in drum 103 allows retainer to remain stationary while drum 103 moves with respect to ring 102. Friction spring 107 is placed over "screw" 105 to provide tension between a base 111 of guide retainer stem 104 and drum 103. Adjustment of the tension of friction spring 107 adjusts the amount of friction between ring 102 and drum 103, and thus adjusts the ease with which drum 103 may be moved with respect to ring 102. The manufacture of this prior art system requires fairly complicated assembly, and an excessive number of parts. Additionally, the drum slides with an excessive friction and binding action over the ring resulting in an awkward and difficult tilt adjustment.

SUMMARY OF THE INVENTION

In accordance with the preferred embodiment of the present invention, an improved tilt and swivel mechanism is presented. The mechanism includes a base on which is placed a rocker. The rocker moves in a rocking motion with respect to the base. The rocker is prevented from moving in a sliding motion with respect to the base. The base and rocker are attached to the swivel ring. The base swivels with respect to the ring. The present design allows for simplicity of manufacture and maximum ease of use.

DESCRIPTION OF THE PREFERRED EMBODIMENT

Figure 1:
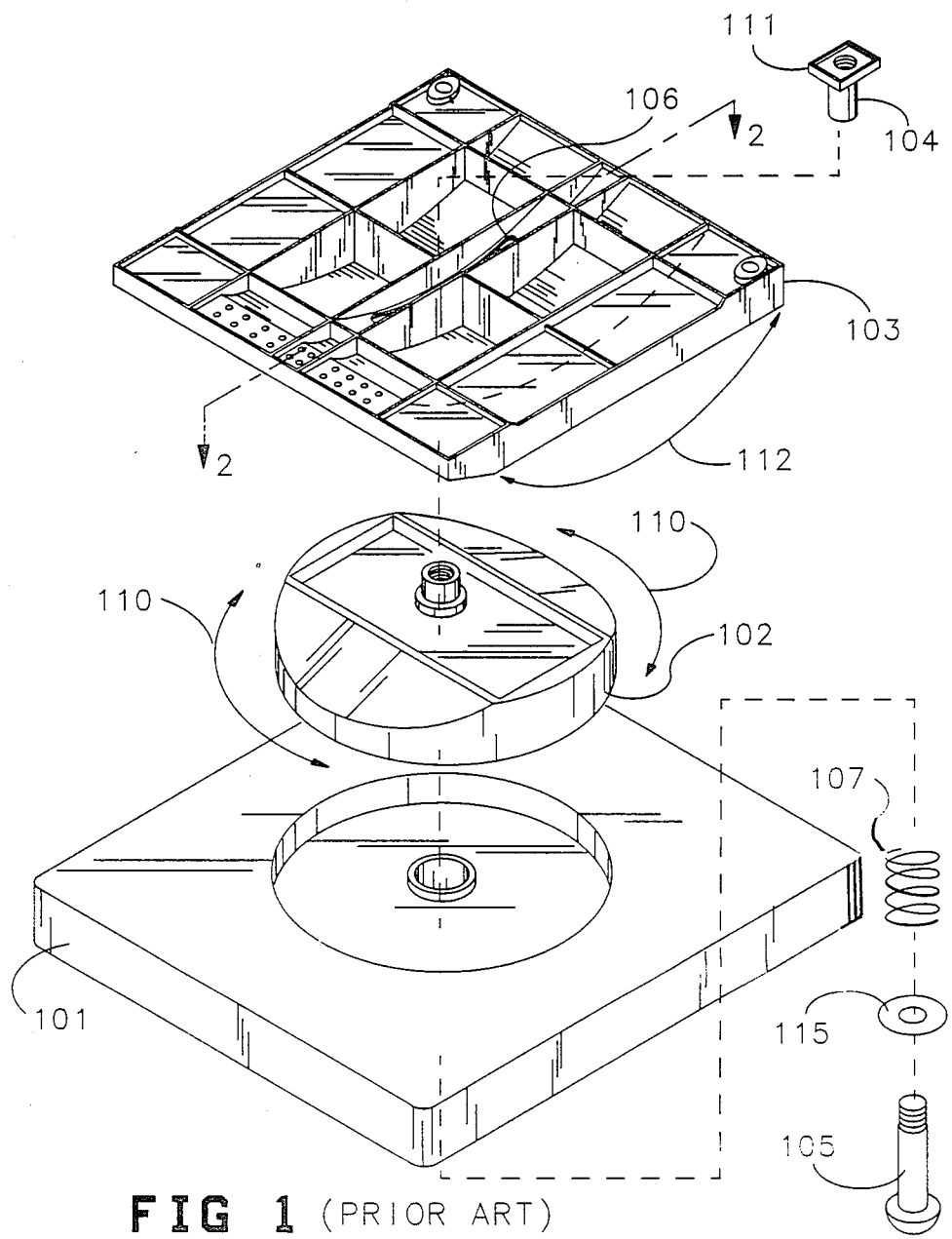
FIGS. 1, 2 and 3 show a prior art tilt and swivel mechanism.
Figure 2:
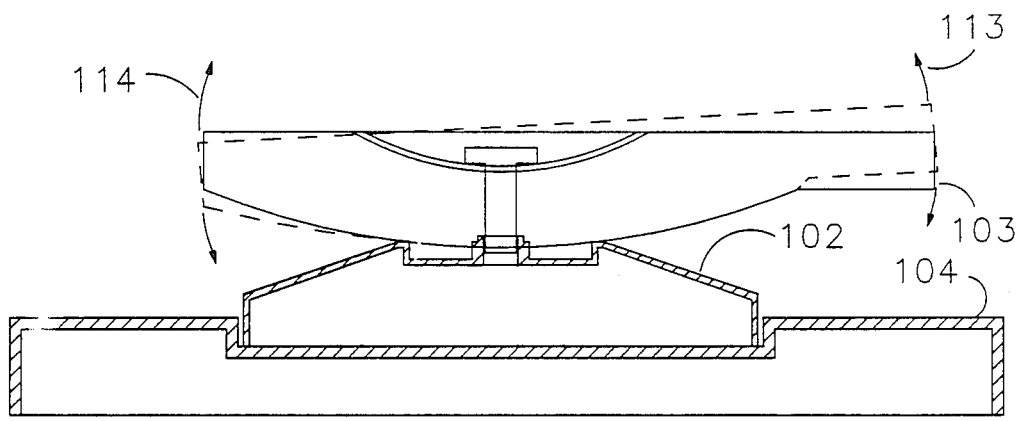
Figure 3:
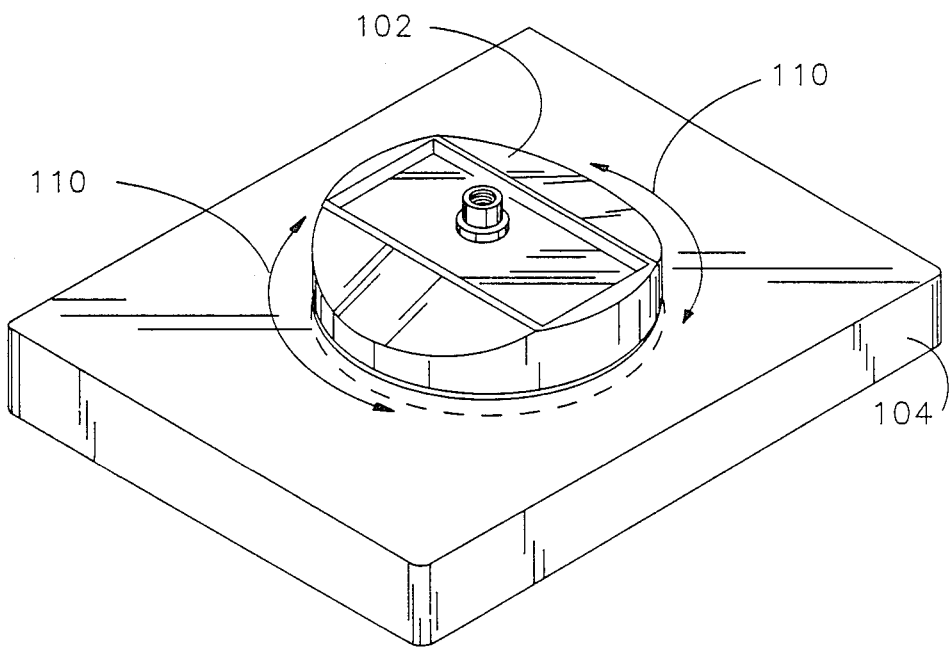
Figure 4:
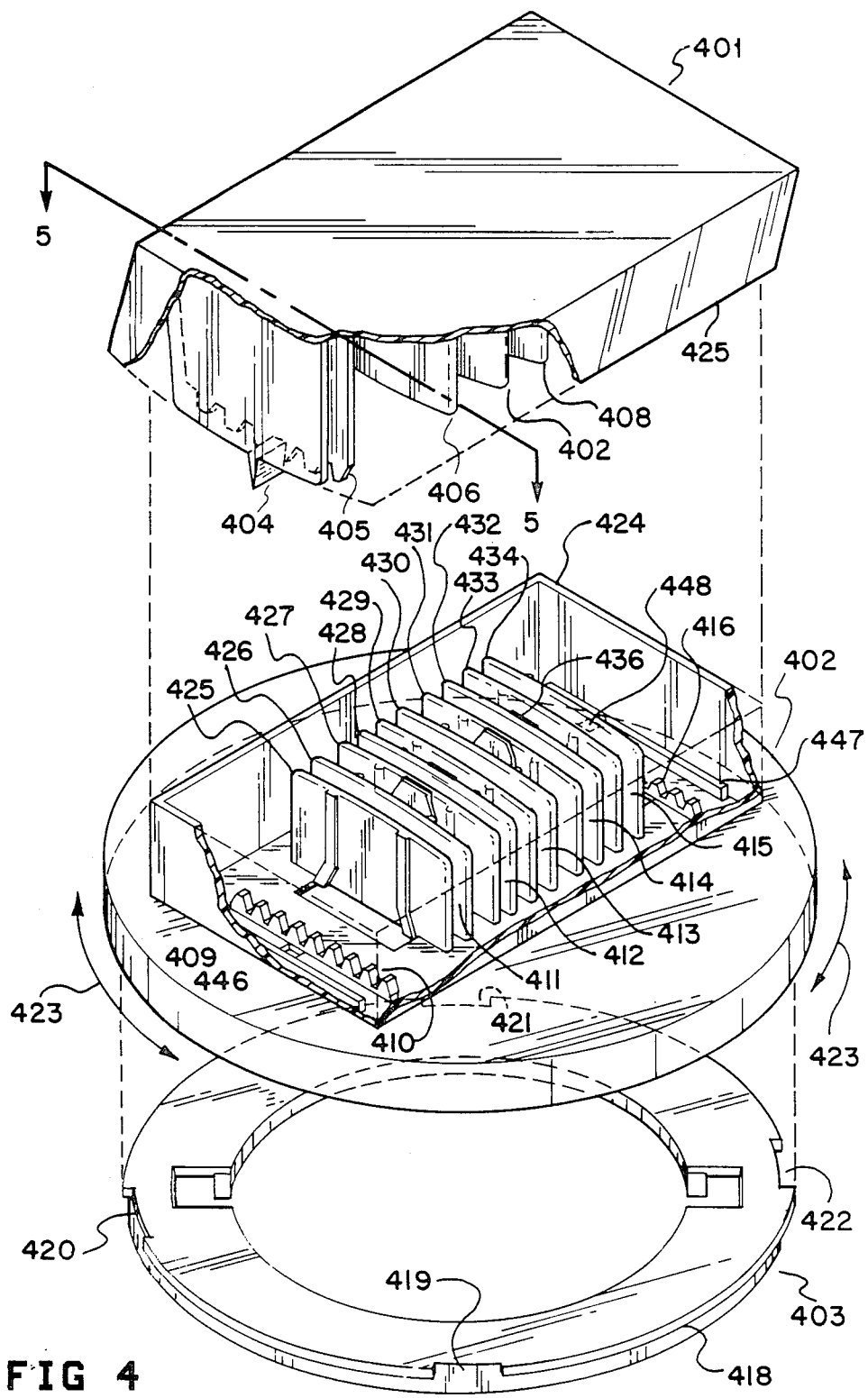
FIGS. 4, 5, and 6 show a tilt and swivel mechanism in accordance with the preferred embodiment of the present invention.

In FIG. 4, an embodiment of an improved tilt and swivel mechanism is shown. A base 402 is placed upon a swivel ring 403. Base 402 moves with respect to swivel ring 403 in the direction shown by arrows 423.

Figure 7:
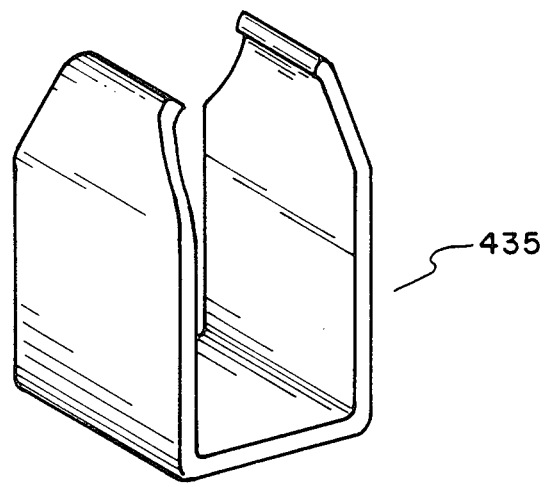
FIG. 7 shows a friction spring used in the tilt and swivel mechanism shown in FIGS. 4, 5 and 6.

Molded upon base 402 is a sleeve 424. Inside sleeve 424 are a series of slots 411, 412, 413, 414 and 415, created by slot walls 425-434. On one side of slots 411-415 is located a linear gear rack 410, a tab slot 409 and a rocking surface 446. On the other side of slots 411-415 is located gear 416, a tab slot 448 and a rocking surface 447. A friction spring 435 is attached to slot walls 427 and 428. A friction spring 436 is attached to slot walls 431 and 432. Friction spring 435 is also shown in FIG. 7.

Figure 6:
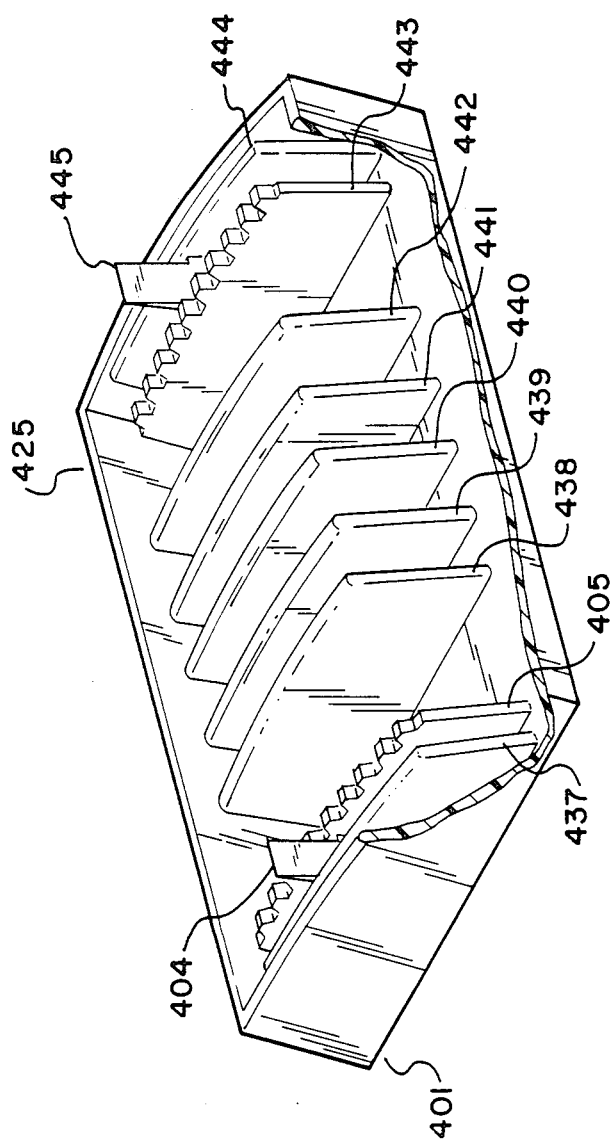

A rocker 401 is placed upon base 402. FIG. 6 shows greater detail of rocker 401. A sleeve 425, runs the perimeter of rocker 401. When rocker 401 is fitted onto base 402, sleeve 425 fits over sleeve 424. Also, tabs 404 and 445 fit respectively into tab slots 409 and 448. A rocking leg 437 comes into contact with rocking surface 446, and a rocking leg 444 comes into contact with rocking surface 447. A gear leg 405 meshes with gear 410 and a gear leg 443 meshes with gear 416. Insert walls 438, 439, 440, 441 and 442 are placed in slots 411, 412, 413, 414 and 415 respectively. Friction springs 435 and 436 provide frictional compression within slots 412 and 414 respectively by preloading slot walls 425-434.

Figure 5:
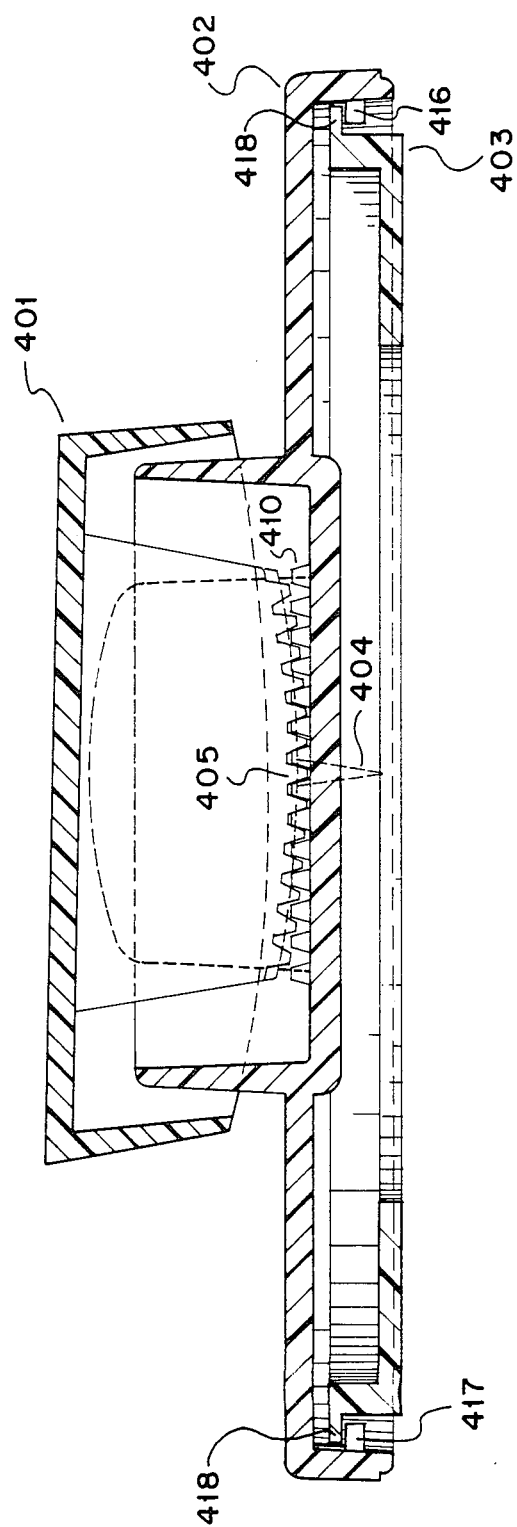

In FIG. 5, rocker 401, base 402 and swivel ring 403 are shown assembled together. Gear leg 405 is shown to be curved with respect to gear rack 410, allowing for a positive, non-slipping, rocking motion. Swivel ring 403 is held in place by four tabs, (tabs 416 and 417 are shown) locking in an edge 418 of swivel ring 403. Edge 418 has slots 419, 420, 421 and 422 into which may be placed tabs 416 and 417 during assembly.

Figure 8:
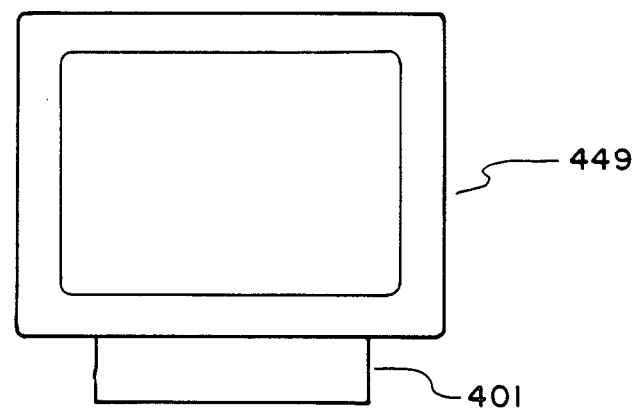
FIG. 8 shows a rocker portion of the tilt and swivel mechanism shown in FIG. 4, molded to a terminal (or monitor) in accordance with the preferred embodiment of present invention.

As shown in FIG. 8, rocker 401 may be molded onto the case of a terminal or monitor display 449, for ease of manufacture.

I claim:

1. A tilt and swivel apparatus which provides for the tilting and swiveling of an object, the apparatus comprising:

a base;

support means for supporting the object;

rocking means, coupled to the base and to the support means, for allowing the supporting means to move in a rocking motion with respect to the base;

antisliding means for preventing the support means from moving in a sliding motion with respect to the base, the anti-sliding means includes a first gear rack coupled to the base and a first gear coupled to the support means and wherein the first gear rack and the first gear intermesh, a tab slot within the base; and, a tab coupled to the support means, wherein the tab is placed in the tab slot; and, friction means coupled to the base and to the support means for preventing the support means from rocking freely on the base, the friction means includes a plurality of slot walls each slot wall mounted on the base and extending up from the base, the slot walls arranged to form a plurality of slots, a plurality of insert walls coupled to the support means, wherein the plurality of insert walls is placed within the plurality of slots, and a friction spring attached to two slot walls of the plurality of slot walls to increase the pressure of the two slot walls upon an insert wall from the plurality of insert walls.

* * * * *